US 6,553,289 B2

(12) United States Patent
Maki et al.

(10) Patent No.: US 6,553,289 B2
(45) Date of Patent: Apr. 22, 2003

(54) CONTROL APPARATUS HAVING OBJECT-ORIENTED SELF-DIAGNOSIS PROGRAM

(75) Inventors: Yoshiyuki Maki, Kariya (JP); Masaya Oi, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/840,877

(22) Filed: Apr. 25, 2001

(65) Prior Publication Data

US 2001/0041954 A1 Nov. 15, 2001

(30) Foreign Application Priority Data

Apr. 28, 2000 (JP) ........................ 2000-130180

(51) Int. Cl.[7] ................. G05B 15/02; G01M 15/00; G06F 15/16
(52) U.S. Cl. .................. 701/29; 701/31; 702/183; 709/201
(58) Field of Search .............. 701/29, 31, 34; 702/183, 185; 709/201, 223, 224; 714/26, 38, 46; 700/17, 79, 18, 86, 87; 706/53, 45, 46, 54

(56) References Cited

U.S. PATENT DOCUMENTS

| 5,063,523 | A | * | 11/1991 | Vrenjak ............... 364/514 |
| 5,528,516 | A | * | 6/1996 | Yemini et al. ......... 364/551.01 |
| 5,671,141 | A | * | 9/1997 | Smith et al. .......... 364/424.034 |
| 5,745,675 | A | * | 4/1998 | Herbig et al. ......... 395/183.14 |
| 5,797,135 | A | * | 8/1998 | Whalen et al. ............... 706/53 |
| 6,157,864 | A | * | 12/2000 | Schwenke et al. ............ 700/79 |
| 6,208,955 | B1 | * | 3/2001 | Provan et al. ............... 703/20 |
| 6,249,755 | B1 | * | 6/2001 | Yemini et al. .............. 702/183 |

FOREIGN PATENT DOCUMENTS

| EP | 0 987 423 | 3/2000 |
| JP | 62-291537 | 12/1987 |

* cited by examiner

Primary Examiner—Tan Q. Nguyen
Assistant Examiner—Dalena Tran
(74) Attorney, Agent, or Firm—Nixon & Vanderhye P.C.

(57) ABSTRACT

A self-diagnosis program for a vehicle is object-oriented designed. The self-diagnosis program is provided with a malfunction detection object for detecting a malfunction provided for each malfunction detection processing, and a malfunction information storage object for storing the malfunction information provided for each malfunction item. A malfunction information management object has the correlative relation between the malfunction detection object and the malfunction information storage object. Upon receiving a normality/abnormality message from the malfunction detection object, the malfunction information management object determines the corresponding malfunction information storage object and stores the malfunction information.

10 Claims, 12 Drawing Sheets

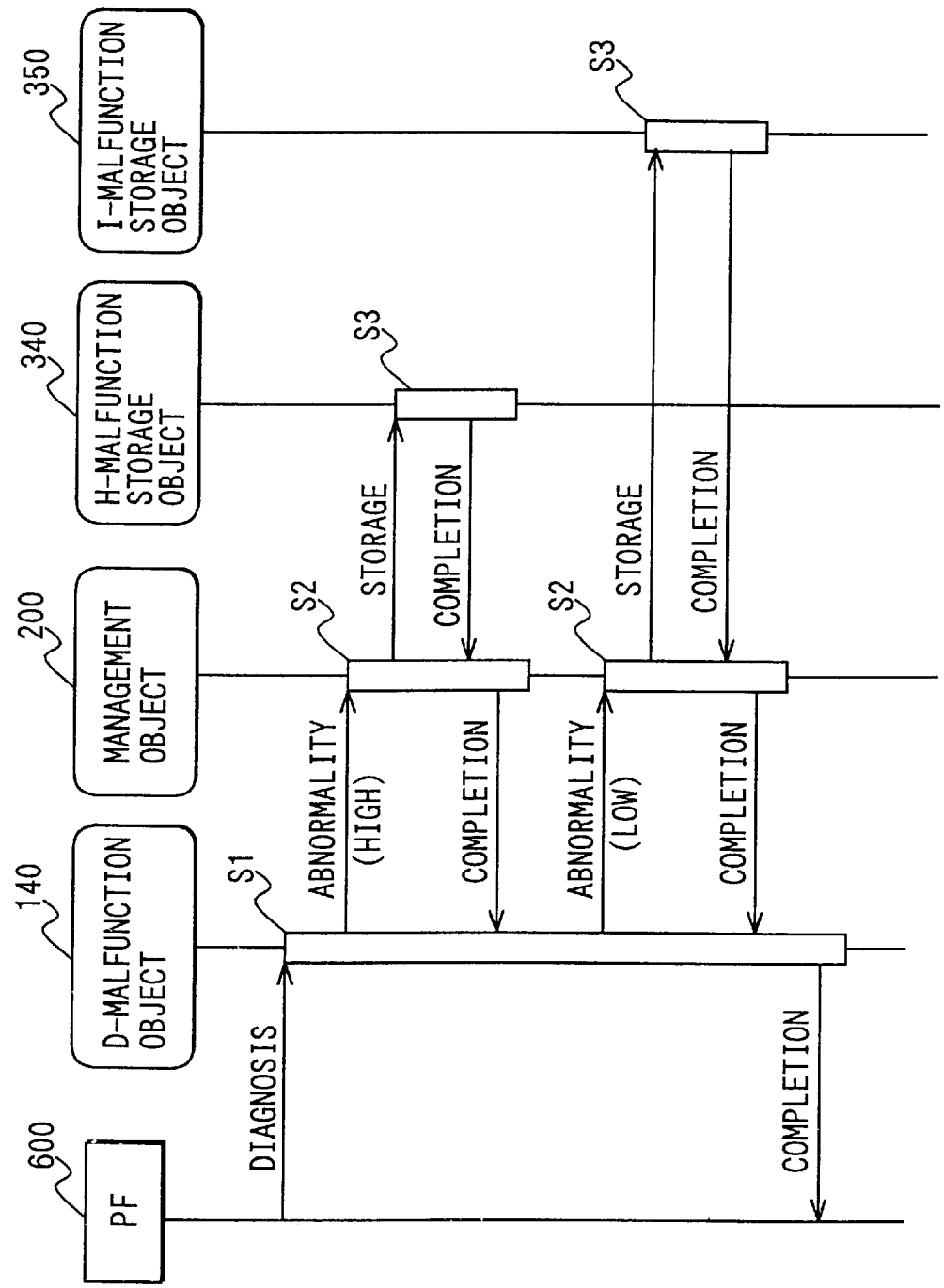

FIG. 12

FFD

| PID SUPPORT DATA |
| --- |
| MALFUNCTION CODE |
| A/F F/B CONTROL CONDITION |
| LOAD VALUE |
| WATER TEMPERATURE |
| A/F F/B CORRECTION COEFFICIENT |
| A/F LEARNING CORRECTION COEFFICIENT |
| INTAKE ABSOLUTE PRESSURE |
| ENGINE SPEED |
| VEHICLE SPEED |

CONTROL APPARATUS HAVING OBJECT-ORIENTED SELF-DIAGNOSIS PROGRAM

CROSS REFERENCE TO RELATED APPLICATION

This application is based on and incorporates herein by reference Japanese Patent Application No. 2000-130180 filed Apr. 28, 2000.

BACKGROUND OF THE INVENTION

The present invention relates to a self-diagnosis function of a vehicle control apparatus for controlling a vehicle, and more particularly to a technique that realizes the self-diagnosis function with an object-oriented programming.

A vehicle control computer system is required to have high operation reliability. If the failure of components in such a system is not detected consistently, a vehicle is disabled to run as intended. Therefore, the computer system is provided with a self-diagnosis function to improve the operation reliability.

U.S. patent application Ser. No. 09/383,277 assigned to the same assignee of the present application proposes an object-oriented programming. In this proposed programming, the object that executes processing on a diagnosis target is separated in a self-diagnosis program as a malfunction detection object. Thus, this technique requires that only the malfunction detection object is changed and other objects are re-used, when the diagnosis target is changed.

(1) Cases in which diagnosis target is changed are classified into two sub-cases, that is, the sub-case in which the configuration of the diagnosis target is changed and the sub-case in which the number of diagnosis targets is increased or decreased. For example, in the former sub-case, a water temperature sensor A is used for a certain vehicle type but a water temperature sensor B is used for another vehicle type. In the latter sub-case, a sensor C is not used for a certain vehicle type but the sensor C is used for another vehicle type.

In the case that the same vehicle control is implemented for different vehicle types and vehicle grades, the sensor having the same function is used. Therefore, the configuration of diagnosis target is often changed as in the former sub-case. In the case that only the configuration of diagnosis target is changed, the change of the malfunction detection processing (malfunction detection logic) should be changed, but the malfunction information should not be changed.

On the other hand, the malfunction information corresponds to the malfunction item that is predetermined by regulations or vehicle manufacturers. Therefore, it is required to change the malfunction information when the number of the malfunction items is changed due to a request from a manufacturer, but it is not required to change the malfunction detection processing in some cases.

Thus, although the malfunction detection processing is programmed in the object-oriented manner for each unit of diagnosis targets by separating the processing that depend on the diagnosis target, some re-usable objects are included in the malfunction detection object in some cases of changing diagnosis targets.

(2) Furthermore, in the case that the malfunction detection processing is programmed in the object-oriented manner for each unit of diagnosis targets, two or more malfunction detection objects are involved in the malfunction detection processing redundantly in some cases. This is because the malfunction detection processing is the same, though the diagnosis target is different. The redundancy can be a cause that prevents implementation of a compact self-diagnosis program.

(3) Furthermore, the malfunction information is determined at first in the self-diagnosis program forming process, and is rarely changed later in the course of a vehicle development. On the other hand, the malfunction detection processing for each malfunction information can be changed very often in the course of the vehicle development because sensors and/or detection logic (algorithm) may have to undergo some modifications and changes. If the malfunction information is fixed for the same object, it is required to consider the relation to the malfunction information even when only the malfunction detection processing needs be changed. Thus, the object-oriented programming work becomes heavy.

SUMMARY OF THE INVENTION

It is therefore an object of the present invention to improve re-usability of a self-diagnosis program.

It is another object of the present invention to realize a compact self-diagnosis program and to reduce a programming work for a self-diagnosis.

According to the present invention, a vehicle control apparatus has a self-diagnosis program which is programmed in an object-oriented design. The self-diagnosis program includes a plurality of object units which are provided separately from each other to be replaceable independently of each other. The self-diagnosis program includes a malfunction detection object for detecting a malfunction provided for each malfunction detection processing, and a malfunction information storage object for storing the malfunction information provided for each malfunction item.

Further, the self-diagnosis program preferably includes a malfunction information management object which has the correlative relation between the malfunction detection object and the malfunction information storage object. Upon receiving a normality/abnormality message from the malfunction detection object, the malfunction information management object determines the corresponding malfunction information storage object and stores the malfunction information.

BRIEF DESCRIPTION OF THE DRAWINGS

The above and other objects, features and advantages of the present invention will become more apparent from the following detailed description made with reference to the accompanying drawings. In the drawings:

FIG. 9 is an explanatory diagram showing a malfunction information storage sequence in the case of a throttle sensor diagnosis;

FIG. 12 is an explanatory diagram showing an exemplary freeze frame data.

DETAILED DESCRIPTION OF THE PREFERRED EMBODIMENT

Figure 1:
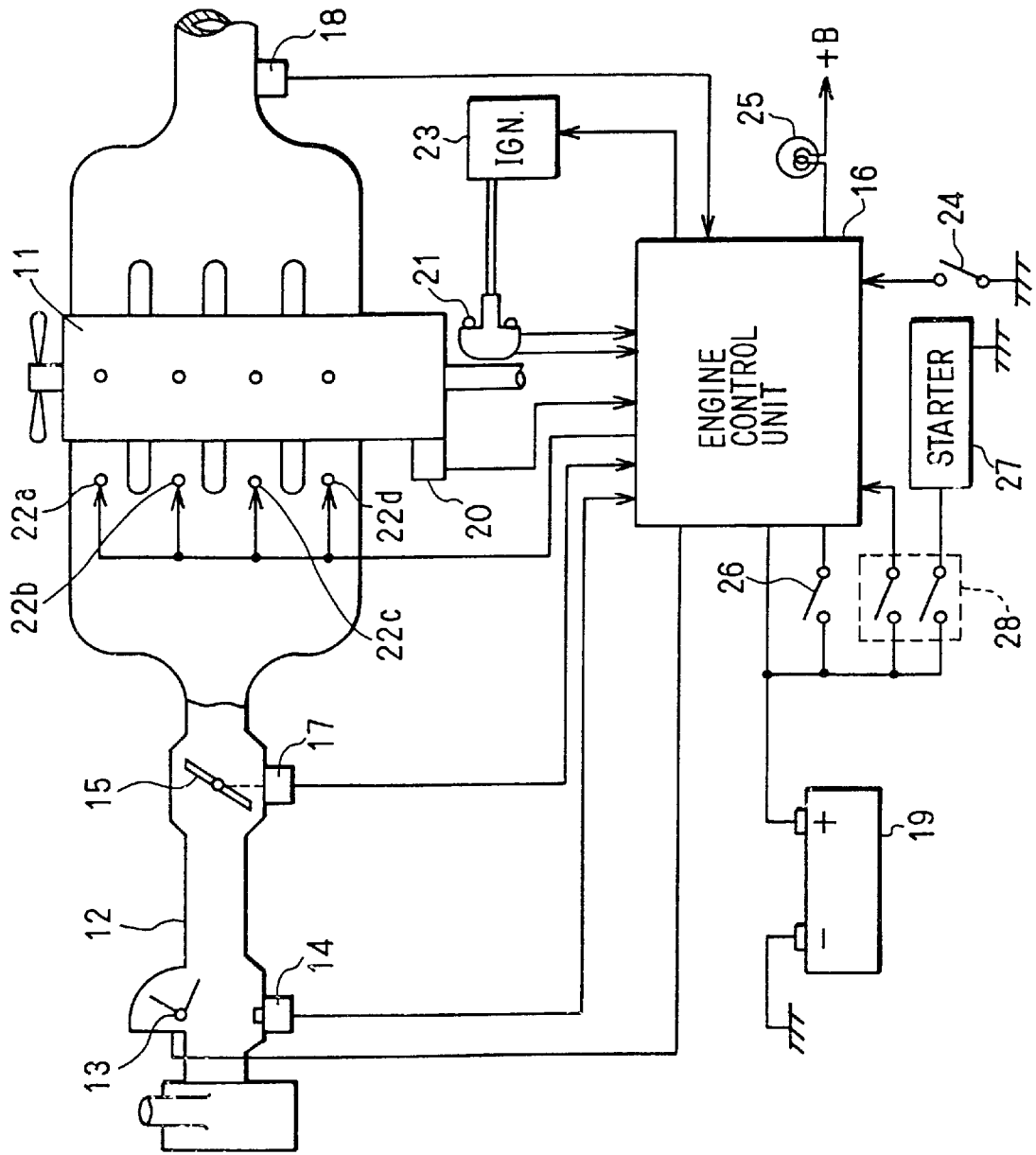
FIG. 1 is a schematic diagram showing an engine control system having a self-diagnosis function according to an embodiment of the present invention.

Referring first to FIG. 1 showing an engine control system of a vehicle, an engine 11 has an intake pipe 12. Intake air is supplied from an air cleaner to the engine 11 through the intake pipe 12. The intake pipe 12 is provided with an air flow sensor 13 for measuring the intake air flow, an intake air temperature sensor 14 for detecting the intake air temperature, and a throttle sensor 17 for detecting the opening angle of the throttle valve 15 that is driven by an accelerator pedal (not shown).

An engine control unit 16 receives various signals that indicate the engine conditions as its inputs. The signals include the intake air flow detection signal generated from the air flow sensor 13, opening angle detection signal generated from the throttle sensor 17, signal generated from an air-fuel ratio sensor 18 for detecting the oxygen concentration contained in the exhaust gas, battery voltage signal generated from a battery 19, detection signal generated from a water temperature sensor 20, and rotation signal and cylinder discrimination signal generated from a distributor 21 driven by the engine 11. A switch 26 is an ignition switch for connecting the battery 19 to the engine control unit 16, and a starter switch 28 for driving a starter motor 27 is provided so as to be connected to the ignition switch 26.

The engine control unit 16 is programmed to calculate required amount of fuel and time of ignitions for the engine 11 based on these various detection signals. The engine control unit 16 supplies fuel injection commands to respective injectors 22a, 22b, 22c, 22d of a plurality of cylinders of the engine 11, and supplies ignition command signals to an igniter 23 to thereby control operation of the engine 11.

Furthermore, the engine control unit 16 is programmed to diagnose various components of the vehicle based on the detection signals supplied from various sensors. For diagnosis, the engine control unit 16 is provided with a test switch 24 that is used for setting the diagnosis mode for supplying the malfunction detection result as the output, and connected to an alarm lamp 25 for displaying the diagnosis result obtained as the test result.

Figure 2:
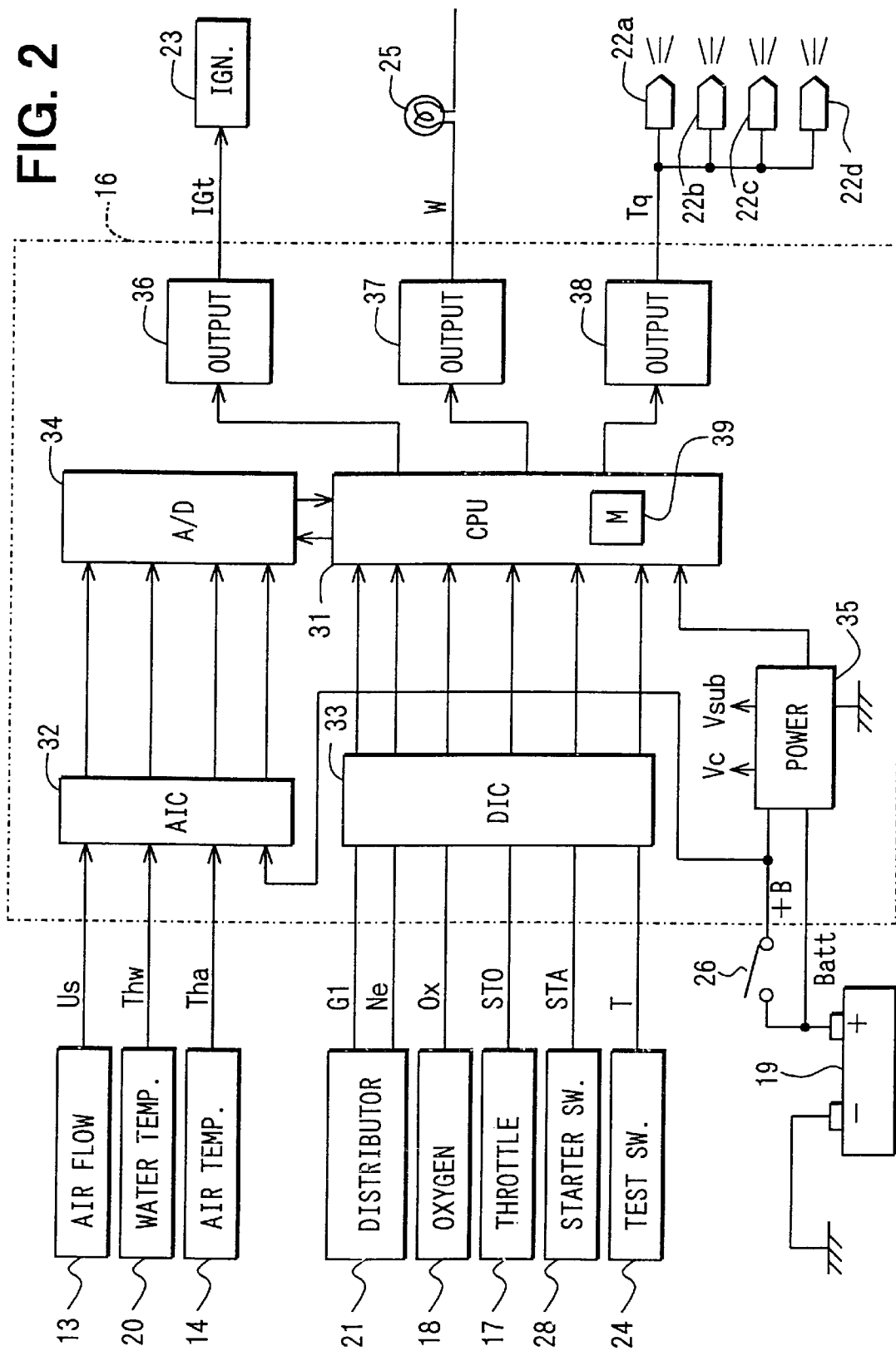
FIG. 2 is a block diagram showing an engine control unit used in the engine control system shown in FIG. 1.

The engine control unit 16 is constructed as shown in FIG. 2. The engine control unit 16 has a CPU 31 that is a component of a computer system. The CPU 31 receives data inputs from an analog input circuit (AIC) 32 and a digital input circuit (DIC) 33, and the analog input data supplied from the analog input circuit 32 is converted to digital data by an A/D converter 34 and supplied to the CPU 31.

The analog input circuit 32 receives a detection signal Us supplied from the air flow sensor 13, a detection signal Thw supplied from the water temperature sensor 20, a detection signal Tha supplied from the intake air temperature sensor 14, and a voltage +B of the battery 19. The digital input circuit 33 receives a cylinder discrimination signal G1 and rotation angle signal Ne supplied from the distributor 21, a oxygen concentration signal Ox supplied from the air-fuel ratio sensor 18, a signal STO indicating the opening angle of the throttle valve 15 supplied from the throttle sensor 17, a start signal STA supplied from the starter switch 28, and a signal T for setting the diagnosis mode supplied from the test switch 24.

The A/D converter 34 reads various detection signals supplied to the analog input circuit 32 successively according to commands supplied from the CPU 31, and converts the signals to the digital data. That is, the A/D converter 34 has a multiplexer function. Furthermore, a power source circuit 35 supplies the voltage +B of the battery 19 to the CPU 31 through the ignition switch 26, and continues to supply a backup power Batt to the CPU 31.

The output data generated from the CPU 31 are supplied to output circuits 36, 37 and 38, and taken out as the output signals generated from the engine control unit 16. The output circuit 36 supplies the ignition command signal IGt to the igniter 23. Furthermore, the output circuit 37 supplies a signal W that represents the diagnosis result to the alarm lamp 25 for lighting it. The output signal Tq supplied from the output circuit 38 that indicates the fuel injection amount for the engine 11 is supplied to the injectors 22a to 22d.

Furthermore, a memory 39 for storing a self-diagnosis program, which will be described hereinafter, is provided in the CPU 31. The memory 39 comprises a ROM and a standby RAM or a non-volatile EEPROM, which is supplied with the electric power Batt, and holds the data continuously even when the ignition switch 26 is turned off. The self-diagnosis program is stored in the ROM. The standby RAM or EEPROM stores freeze frame data (FFD) including the malfunction information and the vehicle condition when malfunction is detected by the execution of the self-diagnosis program.

Figure 3:
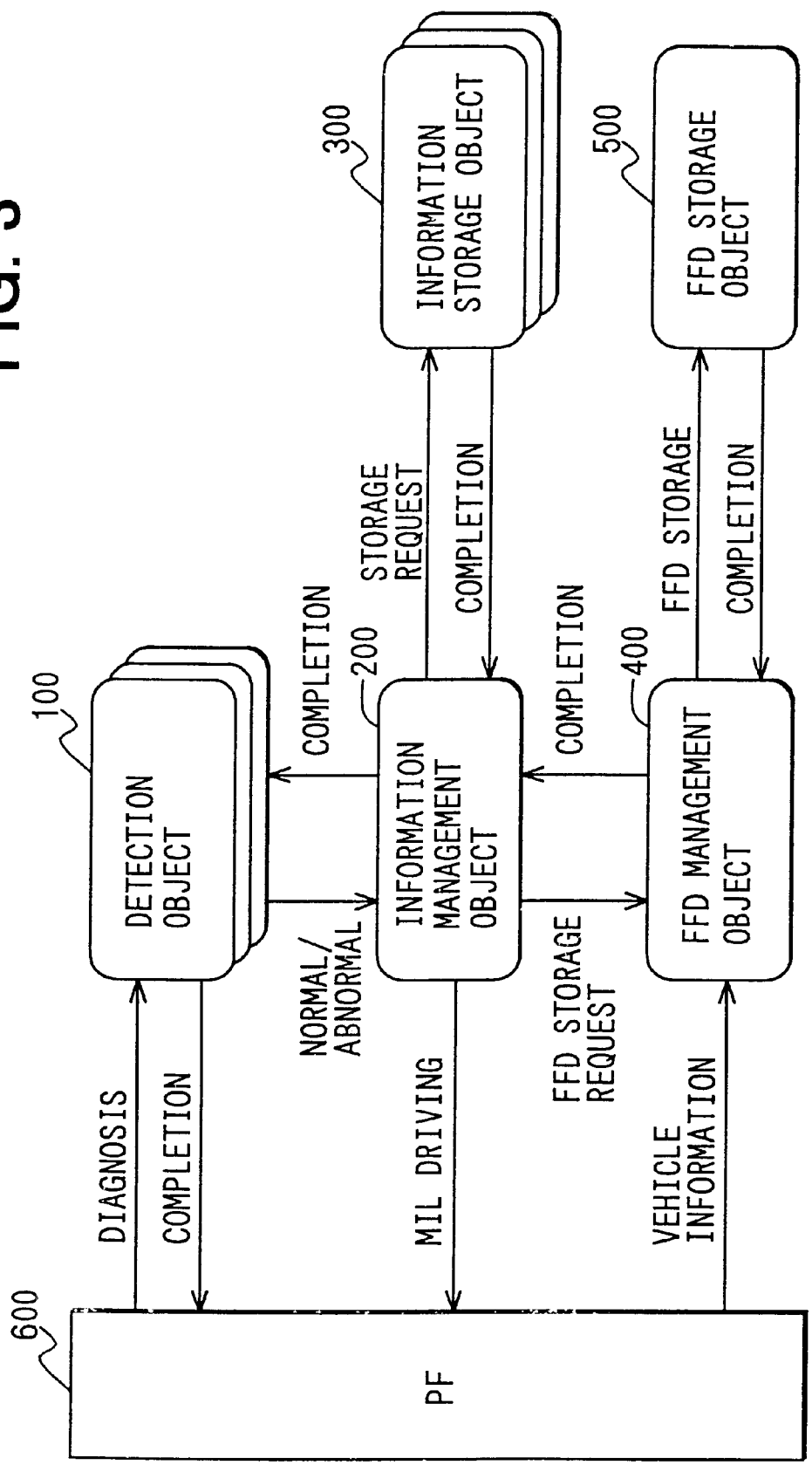
FIG. 3 is an explanatory diagram schematically showing a self-diagnosis program in the embodiment.

The self-diagnosis program is stored in the ROM of the memory 39. The architecture of the self-diagnosis program is shown in FIG. 3. The self-diagnosis program comprises a plurality of programs of object-oriented design.

According to the object-oriented design, a process is modeled in basic unit and the processing is defined with respect to its characteristic and behavior, as opposed to the conventional programming in which the processing is primarily directed to each control process (for example, processing of fuel injection). The basic unit is defined as "object", and the program of object-oriented design is described in the object units as the smallest element. In this program, a series of processing is executed by connecting objects by a message from one object to another. The object is provided with data (attribute) and a method (procedure) for the data, and executes the method in response to messages supplied from other objects. In this specification, the expression in which "object" is used as an object of a sentence will appear in some cases, for example, "the object does something . . . " This means that the CPU 31 executes a processing program actually.

In FIG. 3, only the objects that are necessary for description of the embodiment are shown. In detail, the self-diagnosis program of the embodiment is at least provided with a malfunction detection object 100, a malfunction information management object 200, a malfunction information storage object 300, an FFD management object 400, and an FFD storage object 500. These objects 100 to 500 are programs on a platform (PF) 600, and operate with information exchange between them through the PF 600.

The malfunction detection object 100 detects a diagnosis target, which is a self-diagnosis target, based on the information supplied from sensors to the engine control unit 16. The malfunction detection object 100 is allocated to each malfunction detection processing. That is, even in the case that the diagnosis target is different, the same malfunction detection object 100 functions as long as the malfunction detection method is the same.

The malfunction information management object 200 receives a normality/abnormality message from each malfunction detection object 100, and supplies a malfunction information storage message and MIL driving message. The MIL driving message is supplied to the PF 600, and the alarm lamp 25 is lighted.

The malfunction information storage object 300 receives the malfunction information storage message from the malfunction information management object 200, and stores the malfunction information. The malfunction information storage object 300 is allocated to each predetermined malfunction item.

Furthermore, upon receiving an FFD storage request message from the malfunction information management object 200, the FFD management object 400 acquires the vehicle condition from the PF 600, and issues an FFD storage message. When the FFD management object 400 issues the FFD storage message, the FFD storage object 500 stores the FFD including the vehicle condition that is acquired by the FFD management object 400.

Figure 4:
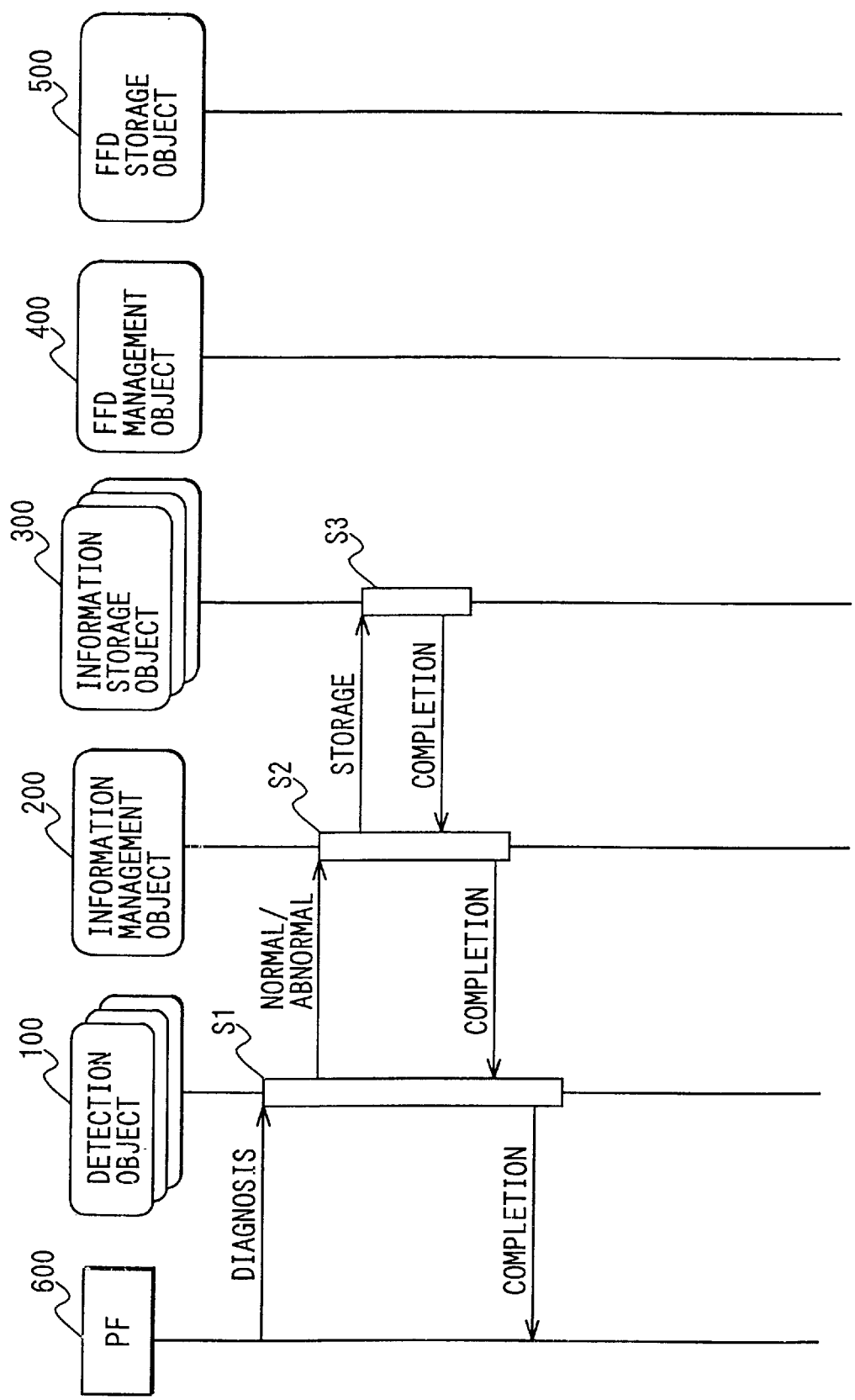
FIG. 4 is a message sequence chart showing a sequence of storing malfunction information in the embodiment.

The objects 100 to 500 are connected by various messages as described above, and execute a series of processing. Next, the connection between the objects 100 to 500 will be described hereinafter with reference to a message sequence chart (MSC). FIG. 4 is the MSC for describing a sequence for storing the malfunction information.

At first, the PF 600 supplies a diagnosis start message to the malfunction detection object 100. The diagnosis start message is supplied individually to malfunction objects 100 at respective timings. The malfunction detection object 100 that has received the diagnosis start indication from the PF 600 executes malfunction detection processing S1. In the malfunction detection processing S1, the normal or abnormality message is supplied to the malfunction information management object 200.

After the normal or abnormality message is supplied, the malfunction information management object 200 executes malfunction level determination processing S2, and issues a malfunction information storage message to the corresponding malfunction information storage object 300. Therefore, the malfunction information management object 200 has the correlative relation between the malfunction detection object 100 and the malfunction information storage object 300.

The correlative relation will be described hereinafter. Upon receiving the malfunction storage message, the malfunction information storage object 300 executes malfunction information storage processing. In the malfunction information storage processing S3, the malfunction information determined in the malfunction level determination processing S2 is stored, and storage completion message is supplied thereafter. In this embodiment, "temporary malfunction" that indicates a temporary malfunction, "definite malfunction" that indicates permanent malfunction, or "normality" that indicates the condition involved in no malfunction is stored as the malfunction information.

In the malfunction level determination processing S2 in the malfunction information management object 200, when the storage completion message is supplied from the malfunction information storage object 300, whether it is the storage timing of the FFD or not is determined, and if it is not the storage timing, then the malfunction information management object 200 supplies the message completion information that indicates the completion of the processing on the normality/abnormality message to the malfunction detection object 100.

Upon receiving the message completion information output, the malfunction detection object 100 supplies a message of the completion to the PF 600. Thus, the diagnosis processing for one malfunction detection object 100 completion.

Figure 5:
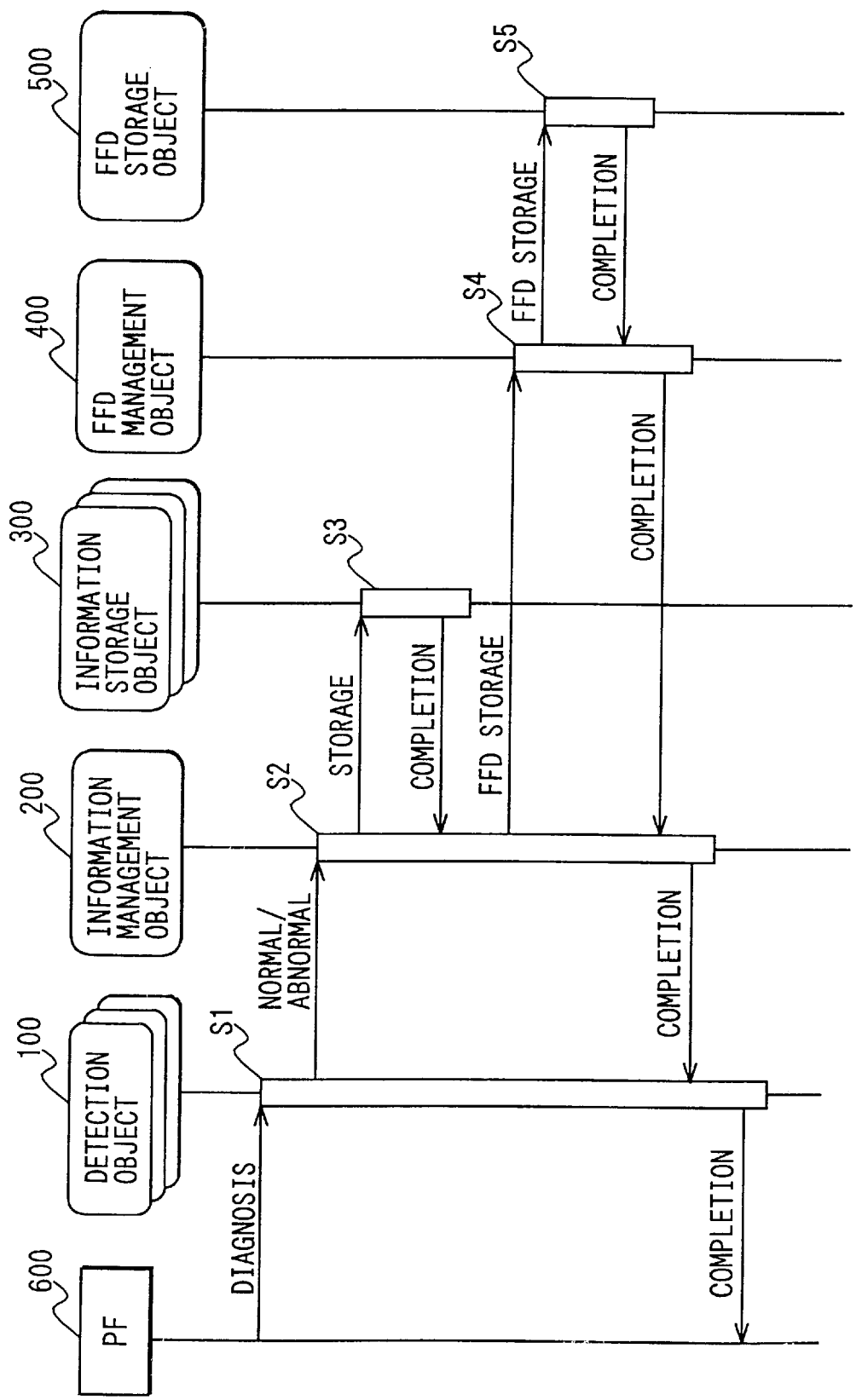
FIG. 5 is a message sequence chart showing a sequence of storing the malfunction information and freeze frame data in the embodiment.

If YES result is obtained in the determination of the FFD storage timing in the malfunction level determination processing S2 by the malfunction information management object 200, then the sequence shown in FIG. 5 is implemented. In detail, after the malfunction information storage object 300 supplies the storage completion message, an FFD storage request message is supplied to the FFD management object 400 in the malfunction level determination processing S2.

Then, the FFD management object 400 executes the FFD storage message issuance processing S4. In the FFD storage message issuance processing S4, the vehicle condition is obtained from the PF 600, and an FFD storage message is issued. Thereby, the FFD storage object 500 executes the FFD storage processing S5. In the FFD storage processing S5, the FFD including the vehicle condition obtained by the FFD management object 400 is stored, and the storage completion message is then supplied. Upon receiving the storage completion message the FFD management object 400 supplies a request completion message corresponding to the FFD storage request to the malfunction information management object 200.

The malfunction information management object 200 supplies the message completion message and the malfunction detection object 100 supplies the diagnosis completion message to the PF 600, and the diagnosis processing thus completion. Whether it is the storage timing of the FFD or not is different depending on the individual malfunction detection content in detail for each malfunction detection object 100. In some cases the FFD is stored when the abnormality becomes definite, and in some other cases the FFD is stored when the abnormality is determined.

Next, the correlative relation between the malfunction detection object 100 and the malfunction information storage object 300 will be described with reference to FIG. 6.

The malfunction detection object 100 is allocated to each malfunction detection processing as described above. For example, in FIG. 6, a malfunction detection object 110 is allocated corresponding to the malfunction detection processing of the air flow sensor 13, a malfunction detection object 120 is allocated corresponding to the malfunction detection processing of the water temperature sensor 20, a malfunction detection object 130 is allocated corresponding to the malfunction detection processing of the intake air temperature sensor 14, and a malfunction detection object 140 is allocated corresponding to the malfunction detection processing of the throttle sensor 17. That is, the malfunction detection objects 110 to 140 diagnose the air flow sensor, water temperature sensor, intake air temperature sensor, and throttle sensor respectively. To define the four malfunction detection objects 110 to 140, these malfunction detection objects 110 to 140 are assigned as A-malfunction detection object 110, B-malfunction detection object 120, C-malfunction detection object 130, and D-malfunction detection object 140, respectively.

At that time, respective unique diagnosis IDs are assigned to A to D malfunction detection objects 110 to 140. The A- to D-malfunction detection objects 110 to 140 supply the diagnosis IDs together with normality/abnormality message to the malfunction information management object 200.

On the other hand, the malfunction information storage object 300 is allocated to each malfunction item as described above. In this example, the malfunction information storage name is in one-to-one correspondence to the malfunction item. That is, each malfunction information storage object 300 is given a unique malfunction information storage name.

Figure 6:
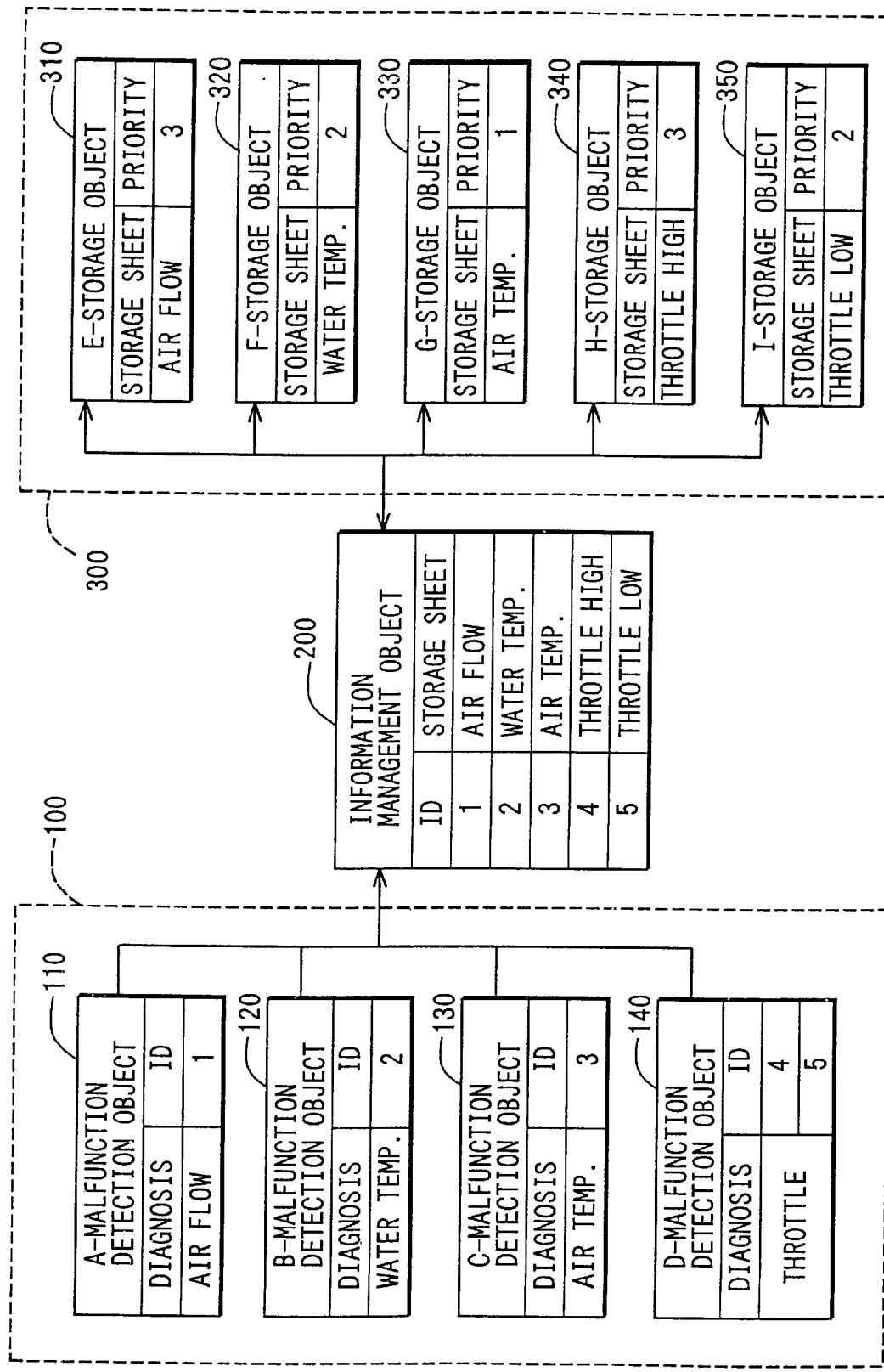
FIG. 6 is an explanatory diagram showing a relation of a malfunction information management object in the embodiment.

For example, in FIG. 6 a malfunction information storage object 310 is given "air flow sheet" as the malfunction information storage name, and a malfunction information storage object 320 is given "water temperature sheet" as the malfunction information storage name. Similarly, a malfunction information storage object 330 is given "intake air temperature sheet" as the malfunction information name, a malfunction information storage object 340 is given "throttle High sheet" as the malfunction information name, and a malfunction information storage object 350 is given "throttle Low sheet" as the malfunction information storage name.

To define the five malfunction information storage objects 310 to 350, these malfunction information storage objects 310 to 350 are defined as E-malfunction information storage object 310, F-malfunction information storage object 320, G-malfunction information storage object 330, H-malfunction information storage object 340, and I-malfunction information storage object 350, respectively, as in the case of the malfunction detection object 100.

The malfunction information management object 200 has the correlative relation between the diagnosis ID of the malfunction detection object 100 and the malfunction information storage name of the malfunction information storage object 300. As shown in FIG. 6, the malfunction information storage name "air flow sheet" corresponds to the diagnosis ID "1", "water temperature sheet" corresponds to "2", "intake air temperature sheet" corresponds to "3", "throttle High sheet" corresponds to "4", and "throttle Low sheet" corresponds to "5".

Thereby, upon receiving a normality/abnormality message from, for example, A-malfunction detection object 110, the malfunction information management object 200 can determine that the corresponding malfunction information storage object 300 is the E-malfunction information storage object 310 based on the diagnosis ID "1" that is supplied together. Therefore, the malfunction information storage message can be supplied to the E-malfunction information storage object 310, or the malfunction information stored in malfunction information storage object 310 can be referred.

In the malfunction detection processing in the D-malfunction detection object 140, not only the normality/abnormality message but also the diagnosis ID "4" or diagnosis ID "5" is generated. At that time, if the diagnosis ID "4" is generated, then the corresponding malfunction information storage object 300 is determined to be the H-malfunction information storage object 340. On the other hand, if the diagnosis ID "5" is generated, then the corresponding malfunction information storage object 300 is determined to be the I-malfunction information storage object 350. As described above, the D-malfunction detection object 140 provided corresponding to the malfunction detection processing is also correlated to the H- and I-malfunction information storage objects 340 and 350 provided corresponding to the malfunction item.

Next, the malfunction detection processing S1, malfunction level determination processing S2, malfunction information storage processing S3, FFD storage issuance processing S4, and FFD storage processing S5 that are executed by the respective objects 100 to 500 will be described in detail to further understanding of the operation of the objects 100 to 500.

Figure 7:
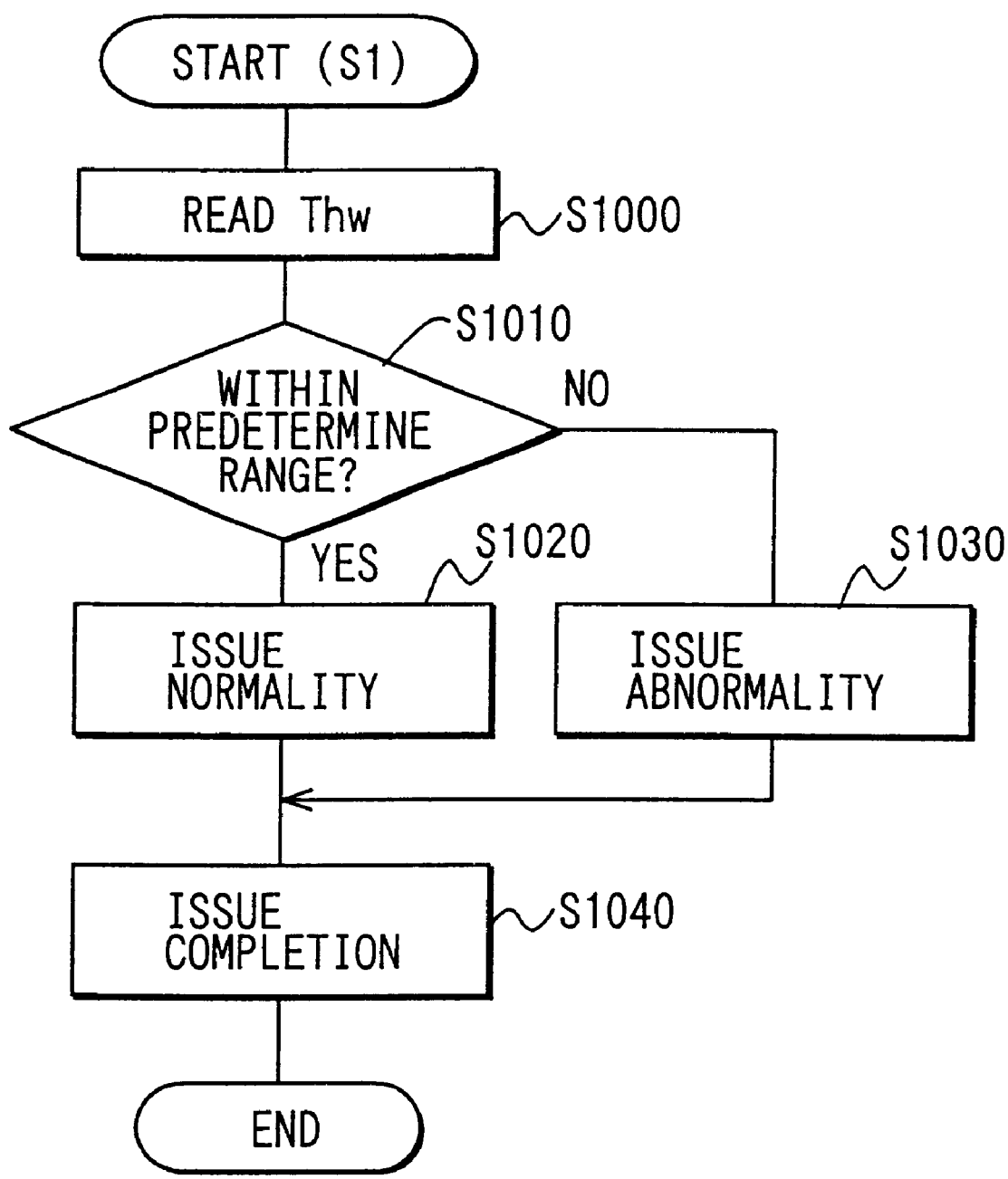
FIG. 7 is a flow chart showing malfunction detection processing of a water temperature sensor in the embodiment.

At first, the malfunction detection processing S1 will be described with reference to FIG. 7 and FIG. 8. FIG. 7 is a flow chart showing the malfunction detection processing S1 executed by the B-malfunction detection object 120. The malfunction detection processing S1 is executed when the diagnosis start message is supplied from the PF 600.

In the first step (S) 1000, a water sensor value is read. The term "water temperature value" used herein means a voltage value of the detection signal Thw supplied from the water temperature sensor 20.

Subsequently in S1010, whether the water temperature sensor value is within a predetermined range or not is determined. For example, in the case that the water temperature sensor value in a range of 0.1 V to 4.9 V is obtained for the normal condition, if the water temperature value is lower than 0.1 V or higher than 4.9 V, it is considered that the water temperature sensor value is fixed due to electrical disconnection of the sensor. If the water temperature sensor value is determined to be in the predetermined range (S1010: YES), then a normality message is issued to the malfunction information management object 200 in S1020. The malfunction information management object 200 generates a message completion output, and the sequence proceeds thereafter to S1040.

On the other hand, if the water temperature sensor value is determined to be outside the predetermined range (S1010: NO), an abnormality message is issued to the malfunction information management object 200. The malfunction information management object 200 generates a message completion output, and the sequence proceeds thereafter to S1040. The completion message is supplied to the PF 600 in S1040, and the malfunction detection processing S1 is then brought to an end.

In S1020 and S1030, not only the normality/abnormality message is issued but also the diagnosis ID "2" is generated. Thereby, the malfunction information management object 200 can determine the F-malfunction information storage object 320 to be the corresponding malfunction information storage object 300. (FIG. 6).

Figure 8A:
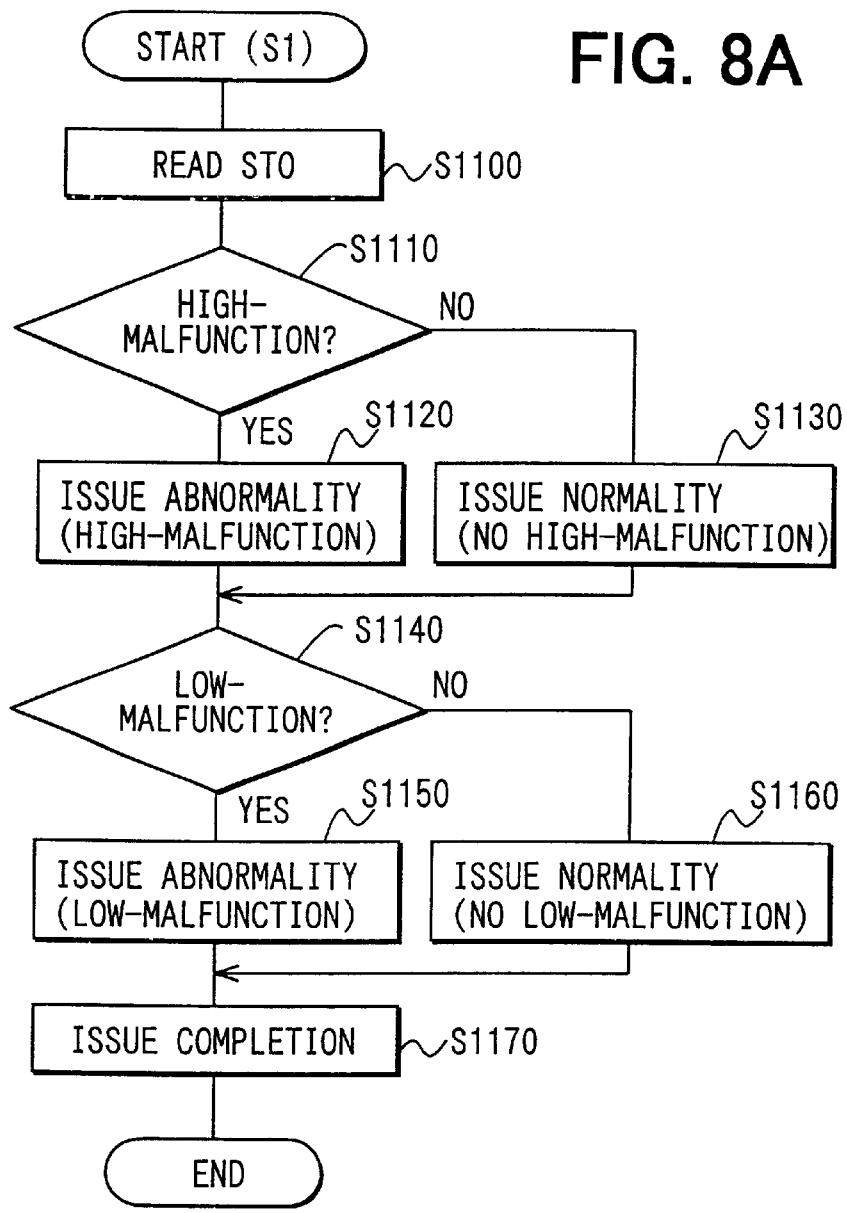
FIG. 8A is a flow chart showing malfunction detection processing of a throttle sensor in the embodiment.
Figure 8B:
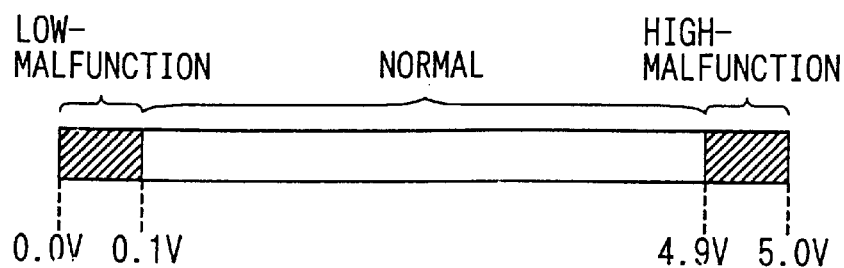
FIG. 8B is an explanatory diagram showing a range of a throttle sensor output used in the processing of FIG. 8A.

FIG. 8A is a flow chart for describing the malfunction detection processing S1 that is executed by the D-malfunction detection object 140. The malfunction detection processing S1 is also executed when a diagnosis start message is supplied from the PF 600. In the same manner as in the case of the water temperature sensor 20, in the case that the throttle sensor value in a range of 0.1 V to 4.9 V is obtained for the normal condition, if the throttle value is lower than 0.1 V or higher than 4.9 V, it is considered that the throttle sensor value is fixed due to electrical disconnection of the sensor. It is possible that the malfunction cause for the throttle sensor value of higher than 4.9 V is different from the malfunction cause for the throttle sensor value of lower than 0.1 V. Herein, the case in which the throttle sensor value is higher than 4.9 V is referred to as a high-malfunction and the case in which the throttle sensor value is lower than 0.1 V is referred to as a low-malfunction for discrimination as shown in FIG. 8B.

A throttle sensor value is read in S1100 shown in FIG. 8A. The term "throttle sensor value" means a voltage value of the detection signal STO supplied from the throttle sensor 17.

In the subsequent S1110, whether the throttle sensor value corresponds to the high-malfunction or not is determined. If the throttle sensor value is determined to be corresponding to the high-malfunction (S1110: YES), that is, if the throttle sensor value is higher than 4.9 V, a high-malfunction abnormality message is issued in S1120. On the other hand, if the throttle sensor value is determined not to be corresponding to the high-malfunction (S1110: NO), a normality message (no high-abnormality) is issued in S1130. A diagnosis ID "4" is generated in S1120 and S1130. After completion of S1120 or S1130, the malfunction information management object 200 generates a message completion output, and the sequence thereafter proceeds to S1140.

Whether the throttle sensor value corresponds to the low-malfunction or not is determined in S1140. If the throttle sensor value is determined to be corresponding to the low-malfunction (S1140: YES), that is, if the throttle sensor value is lower than 0.1 V, a low-malfunction abnormality message is issued in S1150. On the other hand, if the throttle sensor value is determined not to be corresponding to the low-malfunction (S1140: NO), a normality message (no low-abnormality) is issued in S1160. A diagnosis ID "5" is generated in S1150 and S1160. After completion of S1150 or S1160, the malfunction information management object 200 generates a message completion output, and the sequence thereafter proceeds to S1170.

The completion message is supplied to the PF 600 in S1170, and this malfunction detection processing is thereafter brought to an end. In this case, the MSC is shown in FIG. 9.

Upon receiving the normality/abnormality message of the high-malfunction from the D-malfunction detection object 140 (S1120, S1130), the malfunction information management object 200 supplies a malfunction information storage message to the H-malfunction information storage object 340 based on the diagnosis ID "4" output. Thereafter, at the time after the malfunction information management object 200 generates a message completion output, a normality/abnormality message of the low-malfunction is supplied (S1150, S1160) and a diagnosis ID "5" is generated. Thereby, the malfunction information management object 200 supplies, a malfunction information storage message to the I-malfunction information storage object 350.

Figure 10:
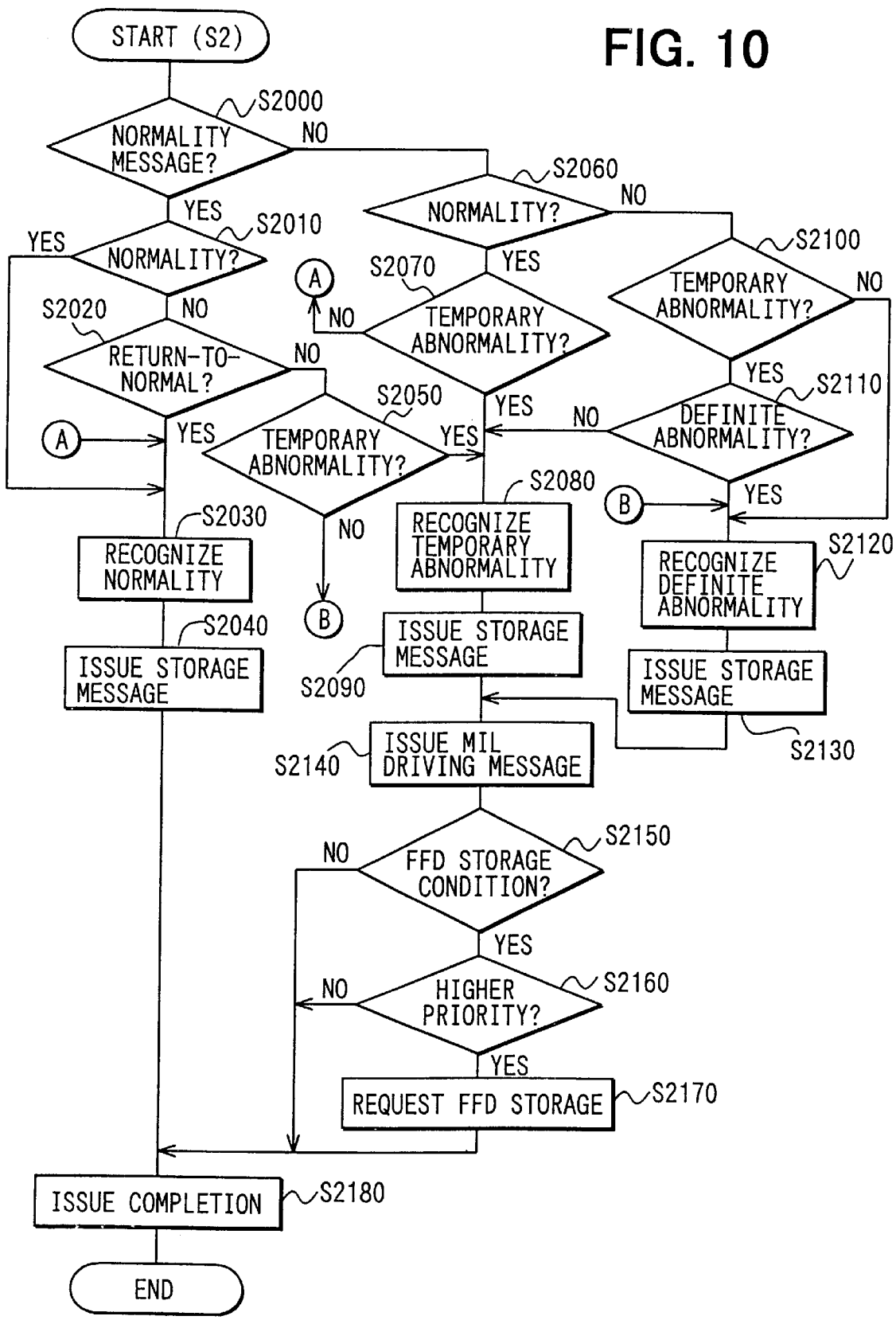
FIG. 10 is a flow chart showing malfunction level determination processing in the embodiment.

Subsequently, the malfunction level determination processing S2 will be described with reference to FIG. 10. FIG. 10 is a flow chart showing the malfunction level determination processing S2 that is executed by the malfunction information management object 200. The malfunction level determination processing S2 is executed when the normality/abnormality message is supplied from the malfunction detection object 100.

In the first S2000, whether the message is a normality message or not is determined. If the message is determined to be a normality message (S2000: YES), the sequence then proceeds to S2010. On the other hand, if the message is determined not to be a normality message (S2000: NO), that is, if the message is determined to be an abnormality message, the sequence then proceeds to S2060.

In S2010, whether the current malfunction information is "normality" or not is determined. The determination is made by referring to the malfunction information stored in the corresponding malfunction information storage object 300. The determination for determining whether the current malfunction information is "temporary abnormality" or "definite abnormality" is made in the same manner as described above in the following. If the current malfunction information is determined to be "normality" (S2010: YES), that is, if a normality message is supplied in the normal condition, the sequence then proceeds to S2030. On the other hand, if the current malfunction information is determined not to be "normality" (S2010: NO), that is, if a normality message is supplied in the abnormal condition, the sequence then proceeds to S2020.

In S2020, whether the return-to-normal condition has been established or not is determined. The term "return-to-normality" means the returning of the malfunction information that was "abnormality" once to "normality" when the normality message is supplied successively in a predetermined time period of, for example, 20 trips or 40 trips of the vehicle. Herein, one trip means a time period from ON to OFF of an ignition key of the vehicle. If the return-to-normal condition is determined to be established (S2020: YES), the sequence then proceeds to S2030. On the other hand, if the return-to-normal condition is not established (S2020: NO), the sequence then proceeds to S2050.

In S2030, the malfunction information is recognized as "normality". In the subsequent S2040, a malfunction information storage message is issued. The message is issued to the malfunction information storage object 300 as described above. At the time after the malfunction information storage object 300 supplies the storage completion message, a message completion message is supplied to the malfunction detection object 100 (S2170), and the malfunction level determination processing S2 is brought to an end.

In S2050, to which the sequence proceeds if the return-to-normal condition is not established in S2020, whether the current malfunction information is "temporary abnormality" or not is determined. If the current malfunction information is determined to be "temporary abnormality" (S2050: YES), the sequence then proceeds to S2080. On the other hand, if the current malfunction information is not "temporary abnormality" (S2050: NO), that is, if the current malfunction information is "definite abnormality", the sequence then proceeds to S2120. The processing that is executed in S2080 and S2120 will be described hereinafter.

In S2060, to which the sequence proceeds if a NO determination is obtained in the first S2000, whether the current malfunction information is "normality" or not is determined. If the current malfunction information is determined to be "normality" (S2060: YES), that is, if an abnormality message is supplied in the normal condition, the sequence then proceeds to S2070. On the other hand, if the current malfunction information is determined not to be "normality" (S2060: NO), that is, an abnormality message is supplied in the abnormal condition, the sequence then proceeds to S2100.

In S2070, whether the temporary abnormal condition is established or not is determined. The term "temporary abnormality" means the condition that is likely the temporary abnormality as described above. If the temporary abnormal condition is determined to be established (S2070), the sequence then proceeds to S2080. On the other hand, if the temporary abnormal condition is not established (S2070), then the processing in S2030 and following steps described above is executed. In this case, the malfunction information is recognized as "normality".

In S2080, the malfunction information is recognized as "temporary abnormality". In the subsequent S2090, a malfunction information storage message is issued to the malfunction information storage object 300. At the time after the malfunction information storage object 300 generates the storage completion message, the sequence proceeds to S2140.

In S2100, to which the sequence proceeds if a NO determination is obtained, whether the current malfunction information is "temporary abnormality" or not is determined. If the current malfunction information is determined to be "temporary abnormality" (S2100: YES) that is, if an abnormality message is supplied in the temporary abnormal condition, the sequence then proceeds to S2110. On the other hand, if the current malfunction information is not "temporary abnormality" (S2100: NO), that is, if an abnormality message is supplied in the definite abnormal condition, the sequence then proceeds to S2120.

In S2110, whether the definite abnormal condition is established or not is determined. The term "definite abnormality" means the condition that is likely the permanent abnormality as described above. If the definite abnormal condition is determined to be established (S2110: YES), the sequence then proceeds to S2120. On the other hand, if the definite abnormal condition is not established (S2110: NO), the sequence then proceeds to the above S2080. In this case, the malfunction information is recognized as "temporary abnormality".

In S2120, the malfunction information is recognized as "definite abnormality". In the subsequent S2130, a malfunction information storage message is issued to the malfunction information storage object 300. Thereafter, at the time after the malfunction information storage object 300 generates a storage completion message, the sequence proceeds to S2140.

In S2140, to which the sequence proceeds from S2090 or S2130, a MIL driving message is issued to the PF 600. Thereby, the PF 600 lights the alarm lamp 25 through the output circuit 37.

In the subsequent S2150, whether the FFD storage condition is established or not is determined. Whether the storage condition of FFD data is established or not is determined based on the diagnosis ID supplied from the malfunction detection object 100. For example, if the diagnosis ID is "2" (FIG. 6), that is, if an abnormality message is supplied from the B-malfunction detection object 120 that is served for water temperature sensor diagnosis, then the FFD storage condition is determined to be established at the time point when a temporary abnormality is found.

Furthermore, for example, if the diagnosis ID is "3" (FIG. 6), that is, if an abnormality message is supplied from the C-malfunction detection object 130 that is served for intake air temperature sensor diagnosis, then the FFD storage condition is determined to be established at the time point when the definite abnormality is found.

If the FFD storage condition is determined to be established (S2150: YES), the sequence then proceeds to S2160. On the other hand, if the FFD storage condition is determined not to be established (S2150: NO), then the sequence does not proceeds and the malfunction level determination processing S2 is brought to an end.

In S2160, whether the FFD priority is higher than that stored previously or not is determined. Herein, the FFD priority will be described herein under. The malfunction information is stored in the malfunction information storage object 300 allocated to each malfunction item. On the other hand, the FFD is stored in one FFD storage object 500. Therefore, the FFD corresponding to two or more malfunction items cannot be stored. Therefore, the FFD priority corresponding to each malfunction item is set for each malfunction information storage object 300.

In FIG. 6, the FFD priority "3" is set to the E-malfunction information storage object 310. In the same manner as described above, "2", "1", "3", and "2" are set to F- to I-malfunction information storage objects 320 to 350, respectively. In this embodiment, the smaller numeral indicates the higher priority.

Therefore, in S2160, the FFD priority of the malfunction information storage object 300 is referred, and if the FFD priority numeral is smaller than the FFD priority numeral that has been stored previously, then the YES determination is obtained. If the FFD priority is determined to be higher (S2160: YES), then an FFD storage request message is issued to the FFD management object 400 (S2170). At the time after the FFD management object 400 generates a request completion message, a message completion output is supplied to the malfunction detection object 100 (S2180), and the malfunction level determination processing S2 is brought to an end.

On the other hand, if the FFD priority is not higher, that is, if the FFD priority is equal to or lower, then the processing of S2170 is not executed, a message completion output is supplied to the malfunction detection object 100 (S2180), and the malfunction level determination processing S2 is brought to an end.

Subsequently, the malfunction information storage processing S3, FFD storage issuance processing S4, and FFD storage processing S5 will be described with reference to FIGS. 11A to 11C.

Figure 11A:
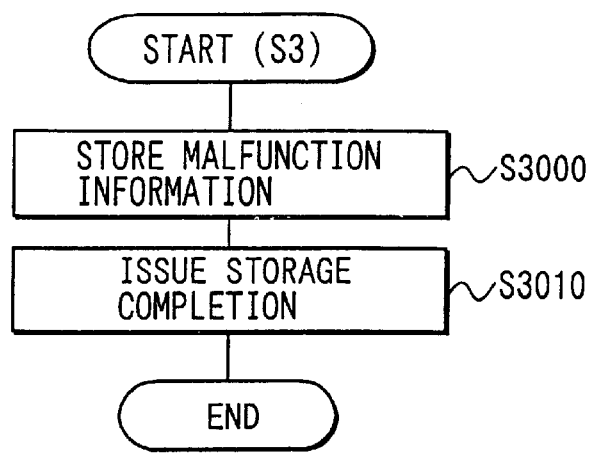
FIG. 11A is a flow chart showing the malfunction information storage processing in the embodiment.

FIG. 11A is a flow chart showing the malfunction information storage processing S3 executed by the malfunction information storage object 300. The malfunction information storage processing S3 is executed when a malfunction information storage message is supplied from the malfunction information management object 200.

When the processing starts, a malfunction information is stored (S3000). A storage completion message is supplied to the malfunction information management object 200 (S3010), and the malfunction information storage processing S3 is thereafter brought to an end.

The malfunction information is stored in the memory 39 as the data of the malfunction information storage object 300. The malfunction information is set in the malfunction level determination processing S2 (S2030, S2080, and S2120 in FIG. 10). At that time, if the malfunction information is configured so as to be substituted to, for example, the global variable that has been determined previously. Then, it is considered that the malfunction information is read from the global variable and stored.

On the other hand, if the malfunction information is configured so as to be the internal data (local variable) of the malfunction information management object 200, then it is considered that the data in the malfunction information management object 200 is referred by supplying a message for requesting the data reference to the malfunction information management object 200 for detail, and the malfunction information is stored. Otherwise, the processing may be employed, in which the malfunction information management object 200 generates the malfunction information together with the malfunction information storage message and the generated malfunction information is stored.

Figure 11B:
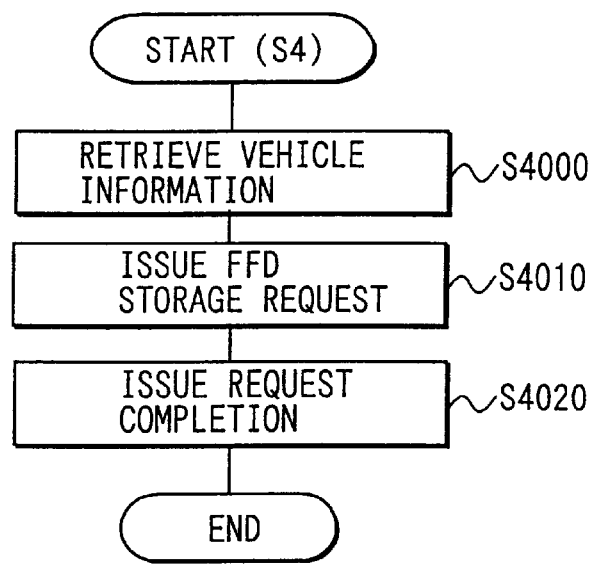
FIG. 11B is a flow chart showing freeze frame data storage message issuance processing in the embodiment.

FIG. 11B is a flow chart showing the FFD storage issuance processing S4 that is executed by the FFD management object 400. The FFD storage issuance processing S4 is executed when an FFD storage request message is supplied from the malfunction information management object 200.

When this processing starts, the vehicle condition that will be a part of the FFD is retrieved (S4000). An FFD storage message is issued to the FFD storage object 500 (S4010), and at the time after a storage completion message is received from the FFD storage object 500, a request completion message is supplied to the malfunction information management object 200 (S4020). Thereafter, the FFD storage issuance processing S4 is brought to an end.

Figure 11C:
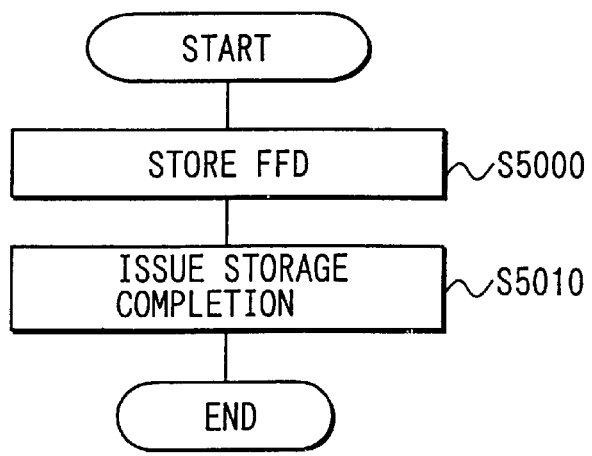
FIG. 11C is a flowchart showing freeze frame data storage processing in the embodiment.

FIG. 11C is a flow chart showing the FFD storage processing S5 that is executed by the FFD storage object 500 at that time.

Herein, the FFD is stored at first (S5000). The FFD is the data including the vehicle condition in malfunction condition. A storage completion message is supplied to the FFD management object 400 (S5010), and the FFD storage processing S5 is thereafter brought to an end.

In this embodiment, the FFD is a group of the data as shown in FIG. 12. In detail, the FFD includes PID support data, malfunction code, air-fuel ratio feedback (A/F F/B) control condition, load value, water temperature, A/F F/B correction coefficient, A/F ratio learning correction coefficient, intake pipe absolute pressure, engine rotation speed, and vehicle speed. The PID support data is an identifier that is served for indicating the used FFD.

The malfunction code is the malfunction information storage name shown in FIG. 6. The A/F F/B control condition is the information that is served to indicate ON/OFF condition of A/F F/B control, and the load value is the value that is served to indicate the load loaded on the engine. Such an FFD item is determined according to the law and specification specified by a manufacturer individually. The FFD is by no means limited to the above-mentioned embodiment. The FFD as described above is helpful to clear up the malfunction cause for repairing.

The FFD of the malfunction item having the higher FFD priority is stored preferentially according to the FFD priority. That is, when an FFD storage request message is received from the malfunction information management object 200 (S2170 in FIG. 10), overwriting is carried out (S5000 in FIG. 11C) if the FFD is stored already.

As in the case of the malfunction information, if the malfunction information is configured so that the vehicle condition obtained by the FFD management object 400 is substituted to, for example, the predetermined global variable, the FFD storage object 500 reads the vehicle condition from the global variable and stores the FFD. Otherwise, if the obtained vehicle condition is the internal data (local variable) of the FFD management object 400, the FFD storage object 500 refers the data in FFD management object 400 and stores the FFD. Further otherwise, if the FFD management object 400 generates the vehicle condition together with the FFD storage message, then the FFD storage object 500 stores the FFD by use of the output vehicle condition.

The above embodiment has the following advantages.

The self-diagnosis program is provided with the malfunction detection object 100 for executing the malfunction detection processing S1 and the malfunction information storage object 300 for executing the malfunction information storage processing S3 to store the malfunction information. Thereby, it is possible that only the malfunction detection object 100 is changed and the malfunction information storage object 300 is re-used as it is, when the diagnosis target configuration is changed.

Furthermore, in the case that the malfunction item is increased or decreased in response to a request from a manufacturer, it is possible that only the malfunction information storage object 300 is changed and the malfunction detection object 100 is re-used as it is. That is, the self-diagnosis program is re-used when only the diagnosis target configuration is changed or only the malfunction information is increased or decreased.

The malfunction detection object 100 is allocated to each malfunction detection processing. In the case that the diagnosis target is different and the malfunction detection processing is common, it is realized as one malfunction detection object 100. Therefore, the self-diagnosis program is made compact.

The malfunction information storage object 300 stores the malfunction information. When the malfunction detection processing is to be changed, any adjustment is not required for the malfunction information storage object 300, and it is not required to consider the relation to the malfunction information. As the result, the self-diagnosis program requires less work for construction.

Furthermore, the malfunction information management object 200 has the correlative relation between the diagnosis ID of the malfunction detection object 100 and the malfunction information storage name of the malfunction information storage object 300 (FIG. 6). Upon receiving the normality/abnormality message from the malfunction detection object 100, the malfunction information management object 200 determines the corresponding malfunction information storage object 300 based on the diagnosis ID that is supplied together with the normality/abnormality message. That is, it is not required that the malfunction detection object 100 adjusts the relation to the malfunction, information storage object 300 and the malfunction information storage object 300 adjusts the relation to the malfunction detection object 100.

For example, in the case that the A-malfunction detection object 110 is replaced in FIG. 6, the diagnosis ID of a new malfunction detection object 100 may be assigned to "1" simply, and any adjustment is not required for the corresponding E malfunction information storage object 310. That is, by providing the malfunction information management object 200, it is made easy to re-use the malfunction detection object 100 and the malfunction storage object 300.

Furthermore, the malfunction level determination processing S2 that is common for the malfunction detection object 100 is executed by the malfunction information management object 200. Such configuration renders the self-diagnosis program more compact.

Furthermore, whether the FFD is stored or not is determined in the malfunction level determination processing S2 (S2150 and S2160 in FIG. 10). The FFD management object 400 obtains the vehicle condition that will be a part of the FFD based on the FFD storage request message supplied from the malfunction information management object 200 (S4000 shown in FIG. 11B). The FFD storage object 500 stores the FFD based on the message supplied from the FFD management object 400 (S5000 in FIG. 11C). Because the FFD management object 400 and the FFD storage object

500 that are not dependent directly on the malfunction information are provided separately from other objects 100 to 300, the re-usability of the self-diagnosis program is improved.

The necessary freeze information can be required to change when the malfunction item is changed. In this case, because the FFD management object 400 is provided separately from the malfunction information management object 200 in the embodiment, the FFD management object 400 is prepared to match with the required freeze information. This configuration can easily cope with the requirement.

The present invention is by no means limited to the embodiment, and various changes and modifications may be made in the invention without departing from the scope of the present invention.

For instance, one pattern of the malfunction level determination processing S2 is shown in FIG. 10, but a plurality of patterns may be considered dependent on, for example, the malfunction item. In this case, branching processing by use of, for example, a diagnosis ID at the beginning of the malfunction level determination processing is provided, and the malfunction level may be determined by use of each pattern.

What is claimed is:

1. A vehicle control apparatus comprising:
    a processor unit for executing a self-diagnosis to generate malfunction information corresponding to a plurality of preset malfunction items based on malfunction detection results of a plurality of diagnosis targets; and
    a memory storing a self-diagnosis program executed by the processor unit and the malfunction information, the self-diagnosis program being object-oriented designed and including re-usable object units,
    wherein the self-diagnosis program has:
        a plurality of malfunction detection objects that are allocated corresponding to predetermined malfunction detection processings for malfunction detection;
        a plurality of malfunction information storage objects that are respectively allocated corresponding to the malfunction items for storing the malfunction information; and
        a malfunction information management object that receives the malfunction detection results from the malfunction detection objects, determines the malfunction information storage objects based on the malfunction detection results, and stores the malfunction information based on the malfunction detection results in the malfunction information storage objects,
        wherein each of the malfunction information storage objects issues a storage completion message to the malfunction information management object after storing the malfunction information therein.

2. The vehicle control apparatus as in claim 1, wherein:
    the malfunction information management object executes malfunction level determination processings corresponding to the malfunction detection objects used for determining a level of the malfunction when the malfunction detection results are received from the malfunction detection objects, and stores the malfunction information according to the results obtained in the malfunction level determination processings.

3. The vehicle control apparatus as in claim 2, wherein:
    the self-diagnosis program further has a malfunction condition storage object for storing freeze information including a vehicle condition in malfunction based on the results obtained in the malfunction level determination processings executed by the malfunction information management object.

4. The vehicle control apparatus as in claim 3, wherein:
    the self-diagnosis program further has a malfunction condition management object for obtaining the vehicle condition that is a part of the freeze information and for storing the freeze information in the malfunction condition storage object when a request for storing the freeze information is received from the malfunction information management object.

5. The vehicle control apparatus as in claim 1, wherein each of the malfunction information storage objects is provided separately from each of the malfunction detection objects, and each of the malfunction information storage objects is independently replaceable from each of the malfunction detection objects.

6. The vehicle control apparatus as in claim 5, wherein the malfunction information management object is provided separately from each of the malfunction information storage objects and the malfunction detection objects, and the malfunction information management object is independently replaceable from the malfunction information storage objects and the malfunction detection objects.

7. A self-diagnosis program stored in a object of a vehicle control apparatus, the program comprising:
    a plurality of malfunction detection objects that are allocated corresponding to malfunction detection processings depending on a plurality of diagnosis targets for executing predetermined malfunction detection processings for malfunction detection;
    a plurality of malfunction information storage objects that are allocated corresponding to malfunction items for storing the malfunction information; and
    a malfunction information management object that receives malfunction detection results from the malfunction detection objects, determines the malfunction information storage objects based on the malfunction detection results, and stores the malfunction information based on the malfunction detection results in the malfunction information storage objects,
    wherein the malfunction information storage objects are provided separately from the malfunction detection objects, and the malfunction information storage objects are independently replaceable from the malfunction detection objects.

8. The self-diagnosis program as in claim 7,
    wherein the malfunction information management object is provided separately from both the malfunction information storage objects and the malfunction detection objects, and the malfunction information management object is independently replaceable from both the malfunction information storage objects and the malfunction detection objects.

9. The vehicle control apparatus as in claim 8, further comprising:
    a malfunction condition storage object for storing freeze information including a vehicle condition in malfunction based on the results obtained in the malfunction level determination processings executed by the malfunction information management object;
    wherein the malfunction condition storage object is provided separately from each of the malfunction information storage objects, the malfunction detection objects and the malfunction information management object, and the malfunction condition storage object is independently replaceable from each of the malfunction information storage objects, the malfunction detection objects and the malfunction information management object.

10. The vehicle control apparatus as in claim 9, further comprising:

a malfunction condition management object for obtaining the vehicle condition that is a part of the freeze information and for storing the freeze information in the malfunction condition storage object when a request for storing the freeze information is received from the malfunction information management object;

wherein the malfunction condition management object is provided separately from each of the malfunction information storage objects, the malfunction detection objects, the malfunction information management object and the malfunction condition storage object, and the malfunction condition management object is independently replaceable from each of the malfunction information storage objects, the malfunction detection objects, the malfunction information management object and the malfunction condition storage object.

* * * * *